Feb. 8, 1966 C. H. LOFTUS 3,233,280
POULTRY KNIFE

Original Filed Sept. 13, 1963 3 Sheets-Sheet 2

INVENTOR
CHARLES H. LOFTUS

BY
ATTORNEY

Feb. 8, 1966  C. H. LOFTUS  3,233,280
POULTRY KNIFE

Original Filed Sept. 13, 1963  3 Sheets-Sheet 3

INVENTOR
CHARLES H. LOFTUS

BY
ATTORNEY

United States Patent Office 3,233,280
Patented Feb. 8, 1966

3,233,280
POULTRY KNIFE
Charles H. Loftus, 109 S. Jackson St., Raeford, N.C.
Continuation of application Ser. No. 308,856, Sept. 13, 1963. This application July 2, 1965, Ser. No. 470,347
12 Claims. (Cl. 17—11)

This application is a continuation of my application Serial No. 308,856 filed Sept. 13, 1963, now abandoned. This invention relates to processes, procedures, and apparatus by which certain operations are performed including the preparation of food for human consumption such as the processing of poultry or the like, in which the procedure involves a plurality of steps and all requiring time of performance and some degree of skill.

The invention relates particularly to the assembly line handling of poultry or other objects used for food and utilizing a conveyor system with certain operations performed in connection therewith, such as for example, the removal of the neck, legs, or the like, and relates specifically to a poultry knife by which several cutting operations can be performed.

The processing of poultry and the like preparatory to ready-for-use sale to the consumer has a series of operations including removal of certain appendages such as the neck, legs, etc. This has been time consuming and has involved the use of skilled personnel when the operations were performed in a manner to provide the most satisfactory end product, and frequently resulted in the removal of too much or too little of the appendage resulting in reduction in value of the end product.

It is an object of the invention to provide a poultry knife which can be readily mounted beside a conveyor for poultry or other product and which can be adjusted in accordance with the convenience of the person and the conveyor, and which can be readily used by an unskilled person quickly to detach certain portions of the poultry with minimum effort and maximum accuracy.

Another object of the invention is to provide a knife of the character indicated with means for guiding the product into the proper position and with knife operating means controlled manually by slight pressure by the foot of the operator.

Another object of the invention is to provide a poultry knife in a convenient location to receive a portion of the fowl to be removed with guiding means and a skin compressor which moves or retracts the skin out of position to allow the neck or other portion to be severed to permit the appendage to be removed without the loss of skin.

Figure 1:
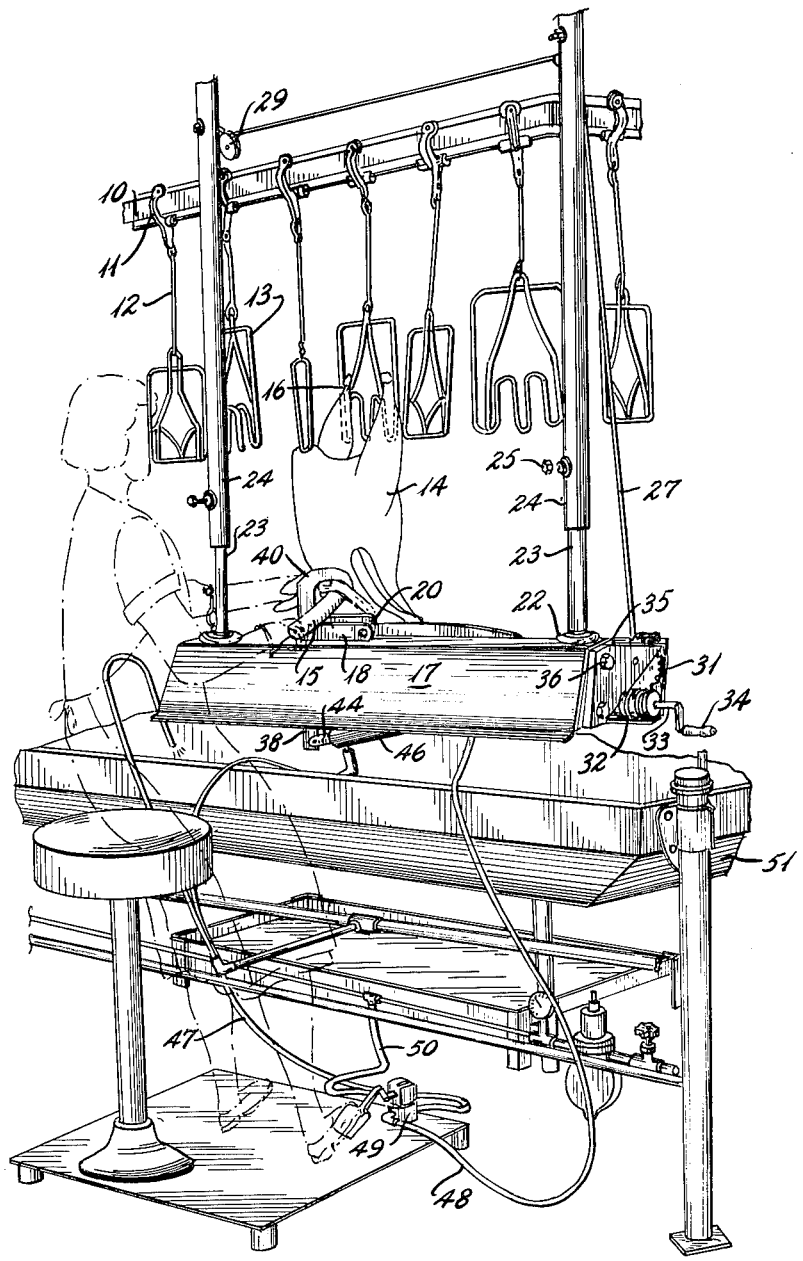
Figure 5:
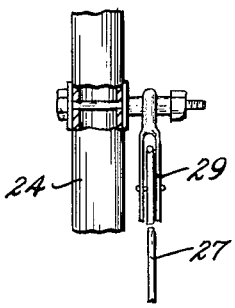
Figure 2:
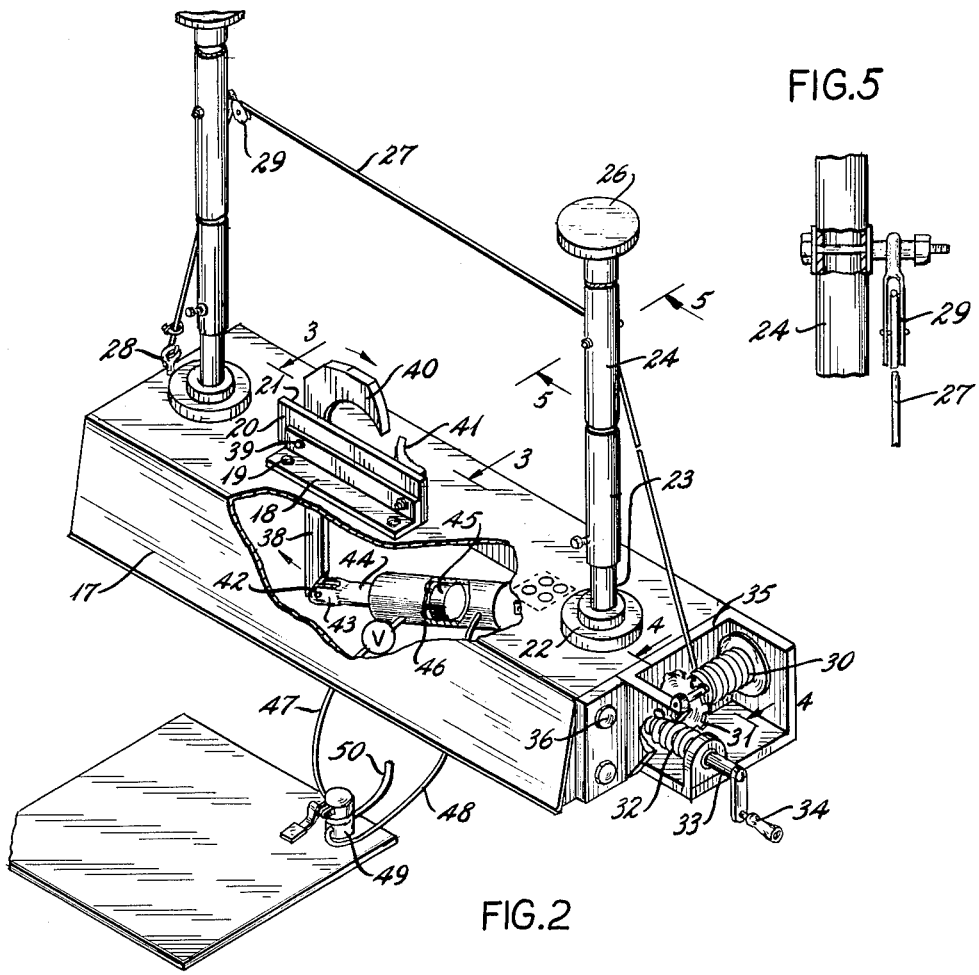
Figure 4:
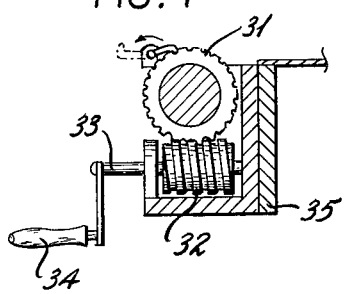
Figure 3:
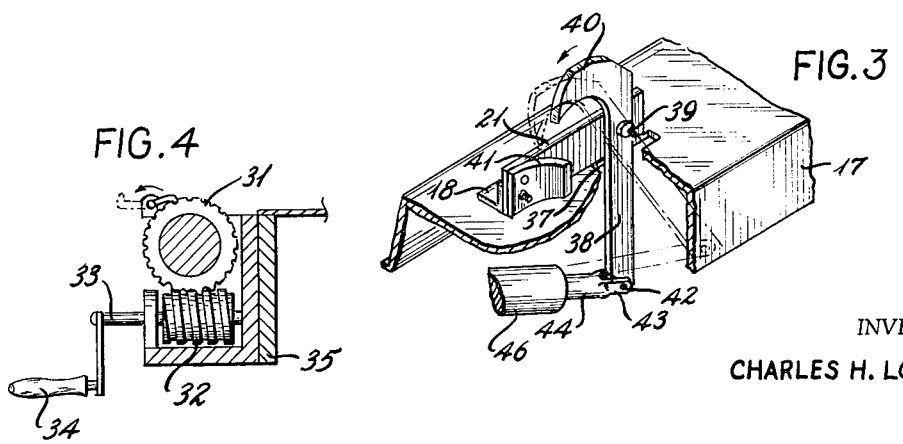
Figure 6:
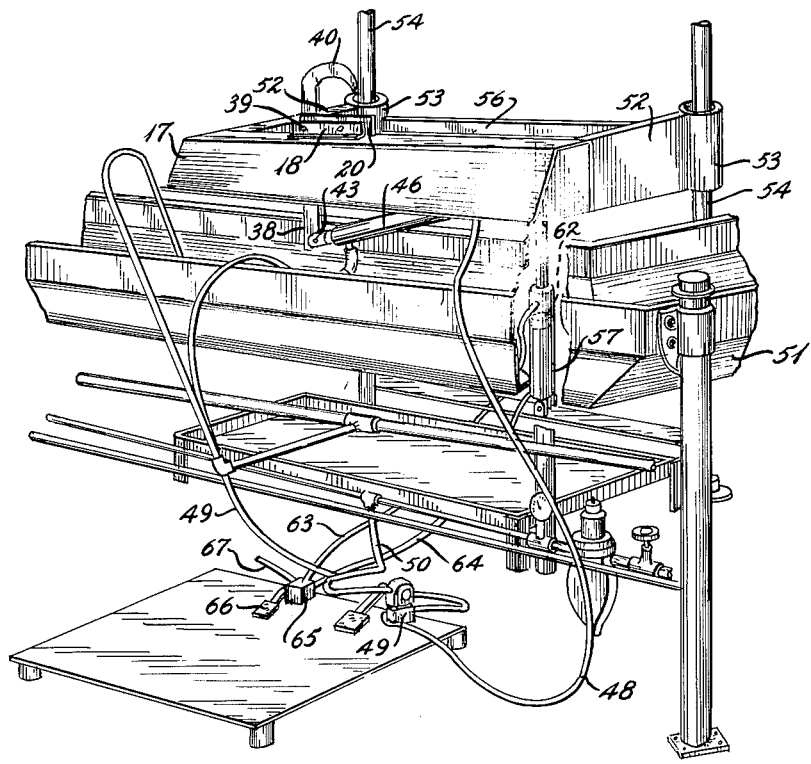
Figure 7:
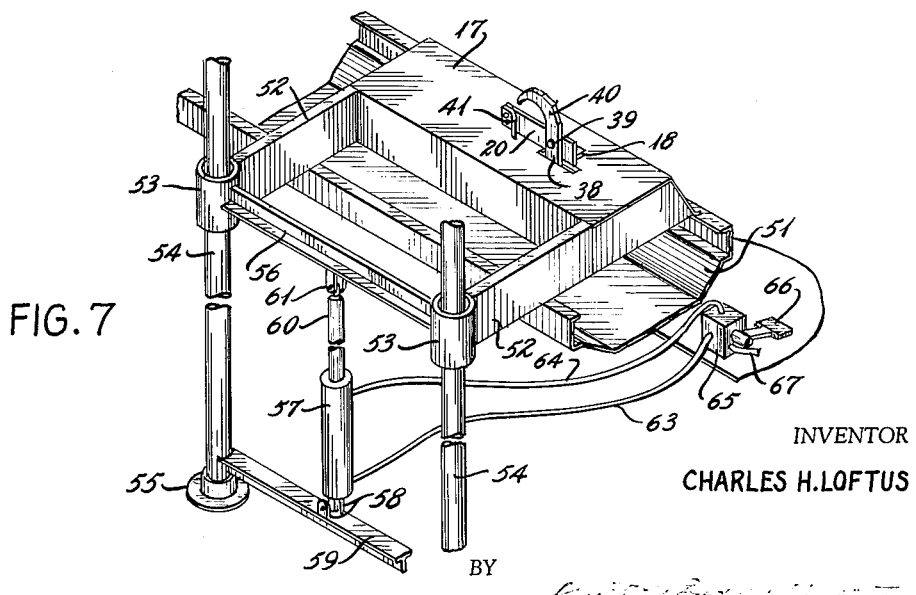

Other objects and advantages of the invention will be apparent from the following description taken in conjunction with the accompanying drawings in which:

FIG. 1 is a perspective illustrating the use of one application of the invention;

FIG. 2, an enlarged perspective of the cutter assembly;

FIG. 3, a fragmentary detail perspective of the cutter;

FIG. 4, a section on the line 4—4 of FIG. 2;

FIG. 5, a section on the line 5—5 of FIG. 2;

FIG. 6, a fragmentary perspective illustrating a modified raising and lowering device; and FIG. 7, a fragmentary perspective illustrating the rear of the device in FIG. 6.

Briefly stated the invention is a poultry knife including a supporting structure and fluid actuated operating structure for the knife. The supporting structure includes a knife holder in the form of a rectangular body that is disposed beside a poultry or other conveyor where it is to be used and carrying a knife on top of the same and including guiding means and a curved member with manual control fluid operating means for forcing engagement with the knife.

With continued reference to the drawings, the present invention contemplates a conveyor system including a track 10 along which move carriers 11 with depending members 12 and a reversible and positioning conveyor hook 13 for each fowl 14 being dressed, such hooks being of a character that they can suspend the fowl either by the neck 15 or the legs 16.

The knife of the present invention is intended to be located adjacently below or beside the conveyor system regardless of its type, and means is provided to support the knife as conveniently as possible for the least possible movement of the conveyed bird from which certain portions thereof are to be removed. For this purpose a generally rectangular hollow housing 17 having a flat top wall is provided on which is mounted a bracket 18 adapted to be fastened in place by bolts and nuts 19 and to have attached thereto a vertically positioned stationary bar type knife member 20 with an elongated upper cutting edge 21.

The hollow housing 17 is adapted to be adjustably mounted in any desired manner as, for example, by multiple cooperating supports including attaching flanges 22 on the top wall of the housing 17 fixed to the lower ends of tubular members 23 which telescope within other tubular members 24 and are adapted to be secured in fixed relation therein by means of set screws 25. The upper ends of the members 24 are provided with attaching flanges 26 by means of which they can be fixed to an overhead support.

Raising and lowering of the housing 17, to position it for use with different sized fowl carried by the conveyor system, can be accomplished by means of a cable 27 attached to the housing 17 by means of a connector 28 at one end and extending over pulleys 29 carried by or between the spaced posts 24. The cable extends around a winch 30 having a gear 31 on one end engaging a worm 32 on a shaft 33 and rotatable by means of a crank 34 to draw in or let out the cable 27 in the raising and lowering operation.

The winch 30 and worm 32 are mounted in a bracket 35 attached to the housing 17 by bolts and nuts 36. The hollow housing 17 and its flat top wall is provided with an opening or slot 37 through which a lever 38 extends, such lever being vertically and pivotally mounted on one of the members 39 securing stationary knife blade 20 on the bracket 18 and provided at its upper end with a curved cutter head or hook blade 40 integral therewith for poultry holding and shearing engagement with the stationary knife edge 21 of blade 20. Thus, for example, when the neck of a chicken is guided beneath the hook blade 40 and the hook blade swung clockwise in FIG. 1 about the pivot 39 such neck will be held and forced against the stationary knife edge 21 and severed by their joint cutting action. In order to provide mechanical means to prevent the neck skin from being cut off when the neck is severed an outwardly extending angular skin depressor member 41 may be fixed mounted on cutter bar 20 adjacent the hook blade 40 such that the angular portion of member 41 is disposed substantially in alignment with blade 40 during its pivoted cutting movement. Thus, in FIGS. 1 and 3 with the operator positioning the neck transversely of the cutter bar 20 by firmly holding the neck at its free end as the fowl is moved by the conveyor longitudinally of and toward the right hand end of the cutter bar the terminal end of the neck skin engages the inclinde outer side of the member 41 and is progressively pushed back or depressed thereby and thus maintained free of the severing function of the cutter mechanism when actuated in a manner to be described.

In order to operate the hook blade 40 for performing the severing action, the lower end of the pivoted blade member 38 may have attached thereto by means of a pin 42 the bifurcated end 43 of a piston rod 44 connected to a piston 45 within a suitably mounted cylinder 46 suspended at one end from the under side of the top wall and within the hollow housing 17, such cylinder having flexible conduit connections 47 and 48 and a pedal operated control valve 49 remote to and separate from housing 17 by which the flow of air can be directed to each end of the cylinder, and a line 50 connecting the control valve 49 to a source of supply. For sanitary purposes a tank 51 is provided below the housing 17 of the cutting means to catch any fluids or drippings.

If desired instead of using a cable for raising and lowering the housing with which the stationary bar knife and curved hook-forming knife head 40 are associated, the housing may be mounted by means of arms 52 fixed to the housing and having tubular outer guide end portions 53 in which are slidably received posts 54 which may have floor-engaging feet 55 as shown in FIGS. 6 and 7. The tubular portions 53 of the arms 52 may be connected by a bar 56 of angle iron or the like. By the raising and lowering of the bar 56 the housing 17 and associated parts likewise will be raised and lowered for purposes previously described. The simple manner of doing this is by means of hydraulic cylinder 57 having one end attached by a lug 58 to a bar 59 connected to the lower portion of the posts 54 and with the cylinder having a piston rod 60 connected by a pivot 61 with the underside of the bar 56. The hydraulic cylinder includes a piston 62 (FIG. 6) and to the cylinder also are two fluid lines 63 and 64 which are connected by a control valve 65 operated by a foot pedal 66. Direct compressed fluid is introduced through a line 67 from a source of supply (not shown) to the opposite ends of the cylinder to selectively perform the raising and lowering operation of the housing 17.

It will be apparent from the foregoing that a relatively simple, practical poultry knife is provided by means of which the necks, legs or other appendages may be readily detached with minimum effort on the part of the operator particularly because of the adjustability of the device to a position most appropriate in view of the use of the device with different sized fowl carried by the conveyor and convenient for the operator.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. The combination with a conveyor system for poultry including a cutting station where appendage portions are to be cuttingly detached from the poultry,
    knife means for detachment of the poultry appendage portions,
    said knife means comprising a vertically positioned generally horizontally extending fixed elongated cutting blade member for location in close parallel proximity to the line of conveyor travel of the appendages of the poultry to be cut,
    a vertically extending member having a downwardly facing hook blade portion at the upper end thereof pivotally mounted in cooperative shearing relation to said fixed elongated cutting blade member,
    a housing having bracket means thereon mounting said knife means in a manner to extend thereabove,
    means vertically and adjustably supporting said housing for disposition of said knife means in close proximity to the line of travel of different sizes of poultry on said conveyor to be cut by said knife means,
    manually operable means for lengthening and shortening said cable for providing the necessary vertical adjustment of said housing to enable the portion of the fowl to be cut to be manually positioned in overlying and contacting relation with said elongated fixed knife blade member,
    power-actuated means for swinging said hook blade member on its pivot to cause severance of the neck of the fowl without detachment of the skin portion thereof, and
    neck skin retracting means mounted on and in operative position to said elongated fixed cutting blade member to engage the neck skin of the fowl and retract the same away from said fixed knife blade member as the fowl is manually guided along and in overlying and contacting relation to said elongated fixed blade member.

2. A poultry knife comprising supporting structure disposed beside and in convenient proximity to a poultry conveyor of a poultry processing plant for detaching appendage portions of chickens or the like,
    said poultry knife comprising a housing having an upper surface disposed generally flat,
    means adjustably mounting said housing on said supporting structure for vertical adjustment relative to the conveyor and for the convenience of an operator,
    bracket means on said housing upper surface fixedly supporting an elongated horizontally extending knife blade in a vertical plane disposed substantially parallel to and adjacent the path of the poultry on the conveyor whereby the poultry may be longitudinally brought into contact with said horizontal fixedly mounted elongated knife blade,
    an elongated generally vertically extending movable knife member extending through slot means in said upper surface and pivoted intermediate its length on said bracket means and in contact with said elongated stationary knife blade,
    said generally vertical pivoted knife member having at its upper end a substantially horizontally extending downwardly facing hook blade portion to form with said fixed elongated horizontally extending knife blade shearing means for appendages of the poultry,
    power means connected to the lower end of said generally vertical knife member and operable to pivot said member in either of two directions about said pivot means to effect operation of said shearing means,
    manually operable means for controlling the actuation of said power means, and
    angular skin retractor means mounted on said bracket means and operably associated with said fixed horizontally extending knife blade for engaging and holdingly retracting the skin from the appendage portion of the poultry severed to prevent cutting of the skin by said shearing means.

3. A power actuated knife mechanism for poultry or the like comprising a supporting structure,
    an elongated housing having a substantially flat top surface member thereon,
    means adjustably mounting said housing on said supporting structure for selective vertical height adjustment thereof,
    said top surface member of said housing having a slot formed therein intermediate the sides and ends thereof,
    an elongated and vertically disposed bar member having a horizontally extending knife edge fixedly mounted on said top surface member in adjacent and aligned relation to said slot,
    a vertically extending bar member pivotally mounted intermediate its length on said elongated bar member intermediate the length thereof and in abutting relation thereto so as to extend through said slot,
    the upper end of said vertically extending member being offset to form a concavely arcuate hook type knife blade coacting with said horizontally extending bar knife edge to form therewith shearing mechanism for removing the appendages of poultry or the like.

power actuated means pivotally connected to the lower end of said vertically extending member for effecting pivotal shearing movement thereof relative to said horizontal knife edge of said elongated bar member, manually operable means for controlling the actuation of said power actuated means, and means for retracting the neck skin of a fowl, said means being mounted on and in operative position to said elongated fixed bar knife member to engage the end of the neck skin of a beheaded fowl when manually moved therealong to retract the neck skin and prevent the cutting thereof when the neck portion of a fowl is severed by said shearing mechanism.

4. For use with a conveyor system adapted for carrying poultry or the like of selective sizes having appendages that are to be severed therefrom, the combination comprising a housing structure having a relatively flat upper surface, means supporting said housing structure for varying the vertical height thereof, said housing structure including a vertically positioned generally horizontally extending elongated knife blade fixedly mounted on said flat upper surface of said housing structure which is adapted to extend substantially parallel to and adjacent to the conveyor system carrying the poultry, a vertically positioned lever pivotally mounted intermediate its length in juxtaposition to said stationary elongated knife blade, said vertically positioned lever having at one end thereof an offset head disposed parallel to said elongated stationary knife blade intermediate the length thereof, said offset head forming an inverted arcuate knife blade operative to co-act with said elongated stationary knife blade to form a holding and shearing means for detaching the appendages of the chickens or the like, power actuated means secured to the opposite end of said vertically positioned lever to effect pivotal movement of said arcuate knife blade relative to said stationary elongated knife blade, remotely positioned manually operable means for energizing and controlling said power actuated means, and skin retractor means rigid with and disposed in the horizontal plane of said elongated stationary knife blade operative to bear against and depress the neck skin of a manually held conveyor supported fowl the neck of which is to be severed to prevent the skin from being detached when the neck is severed by said severing means.

5. A poultry knife comprising supporting structure, a housing carried by said supporting structure and adapted to be disposed in convenient proximity to a conveyor of a processing plant, a generally horizontally extending elongated cutting blade fixedly mounted on said housing, a generally vertically extending lever member pivoted intermediate its length and having a generally horizontally extending hook blade portion at one end thereof operably associated with said fixed horizontally extending knife blade to form therewith a poultry shearing mechanism, pressure means connected to the opposite end of said vertically extending lever member to actuate said shearing mechanism, manually operable means for controlling said pressure means, and appendage skin retracting means operably associated with said fixed horizontally extending knife blade for engaging and retracting the skin from the appendage portion to be severed to prevent the skin from being cut.

6. A poultry knife as recited in claim 5 wherein said supporting structure comprises:

adjustable length supporting members attached at each end of said housing adapted for suspendingly supporting said housing from overhead support structure, cable means extending between said housing and said adjustable length supporting members, winch means extending between said housing and said adjustable length supporting members, and means to lock said housing in any selected vertically adjusted position.

7. A poultry knife as recited in claim 5 wherein said supporting structure comprises:

arm extension means on said housing having outer end portions forming tubular guide members, vertically guiding and supporting members having floor engaging means thereon slidably received in said tubular guide arm extension members, means mounting power actuated jack means connected between said vertical guiding arm extension members to adjustably position and support the weight of said housing structure thereon, and manually operable means for selectively controlling said power actuated jack means.

8. A poultry knife comprising a base, a cutting blade mounted on said base and having an elongated cutting edge, a hook blade type knife mounted on said base in a manner to have a scissors-like action with said first blade, the cutting edges of said blades being in opposed relation in a manner to operate with a shearing action when performing their cutting operation, means for producing relative movement between said blades, manual means for controlling said last mentioned means, and appendage skin retracting means operably associated with said first blade for engaging and retracting the skin from the appendage portion of the poultry to be severed to prevent the skin from being cut.

9. For use with a poultry conveyor system including a cutting station where appendage portions are to be cuttingly detached from the poultry, a power-operated poultry knife comprising:

a generally rectangular hollow housing having a substantially horizontally disposed top wall portion, said top wall portion being substantially flat throughout the entirety of said housing, slot means formed in said housing flat top wall portion intermediate the width and length thereof, bracket means fixedly secured on said flat top wall portion adjacent said slot means, means securing a stationary and generally horizontally extending and vertically positioned elongated cutting blade member on said bracket means, a generally vertically extending unitary knife member mounted within said slot means and having a downwardly facing hook blade portion at the upper end thereof above the flat top surface of said hollow housing, said vertically extending knife blade being pivotally supported by said securing means in cooperative shearing relation to said stationary cutting blade member, power-actuated means dependingly mounted within said hollow housing for swinging said hook blade member on its pivot relative to said stationary blade member to cause severance of appendage portions of the poultry, and pedal-actuated means remotely supported independently of said hollow housing for controlling said power-actuated poultry knife.

10. A poultry knife comprising supporting structure adapted to be disposed beside and in convenient proximity to a poultry conveyor of a poultry processing plant for detaching appendage portions of chickens or the like, said poultry knife comprising a generally horizontally disposed elongated hollow housing the upper surface of which is generally flat throughout the entirety thereof, extendable means adjustably mounting said hollow housing on said supporting structure whereby said hollow housing is adapted for vertical adjustment relative to the conveyor and for the convenience of an operator, bracket means fixedly secured on said hollow housing upper flat surface intermediate the sides thereof, means securing an elongated horizontally extending stationary knife blade on said bracket means in a vertical plane adapted to be disposed substantially parallel to and adjacent the path of the poultry on the conveyor whereby the poultry may be longitudinally brought into contact with said horizontal fixedly mounted elongated knife blade, slot means extending through said housing flat upper surface intermediate the sides thereof, an elongated generally vertically disposed knife member extending downwardly through said slot means in said upper surface and pivoted intermediate its length on said stationary knife blade securing means and in shearing contact relation with said elongated stationary knife blade, said generally vertically disposed pivoted knife member having at its upper end a substantially horizontally extending downwardly facing hook blade portion disposed above said housing upper flat surface to form with said fixed elongated horizontally extending knife blade shearing means for appendages of the poultry, power means suspendingly carried by said hollow housing and connected to the lower end of said generally vertical knife member and operable to pivot said movable knife member in either of two directions about said pivot means to effect operation of said shearing means, and manually operable means mounted independently of said supporting structure for controlling the actuation of said power means.

11. A power-actuated knife mechanism for poultry or the like comprising a supporting structure, an elongated hollow housing having a top wall substantially flat throughout its entirety adjustably mounted on said supporting structure, said supporting structure including telescopic means adjustably mounting said hollow housing selective vertical height adjustment thereof, said flat top wall of said hollow housing having a slot formed therein intermediate the side and ends thereof, an elongated right-angular member mounted on the top of said hollow housing parallel to said slot therein, means fixedly securing an elongated and vertically disposed bar member having a horizontally extending knife edge on said right-angular member in immediate adjacent and aligned relation to said slot, said fixedly securing means pivotally mounting a vertically extending bar knife member intermediate its length on said elongated bar knife member immediate its length and in contacting relation thereto so as to extend downwardly through said slot, the upper end of said vertically extending member being offset to form a concavely arcuate hook type knife blade coacting with said horizontally extending bar knife edge to form therewith shearing mechanism for removing the appendages of poultry or the like, power actuated means pivotally mounted within said hollow housing and pivotally connected to the lower end of said vertically extending member for effecting pivotal shearing movement thereof relative to said horizontal knife edge of said elongated bar member, and manually operable means movably positioned, remote from said hollow housing for controlling the actuation of said power actuated means.

12. For use with a conveyor system adapted for carrying poultry or the like of selective sizes having appendages that are to be severed therefrom, the combination comprising:

a hollow elongated housing structure having a relatively flat upper surface, means including telescopic means suspendingly and fixedly supporting said structure free of a floor therebelow, means including hoist means for varying the vertical height of said hollow housing, said hollow housing structure including a vertically positioned generally horizontally extending elongated stationary knife blade fixedly mounted on said flat upper surface of said housing structure and intermediate the periphery thereof, said elongated housing structure being adapted to extend substantially parallel to and adjacent to the conveyor system carrying the poultry, a substantially vertically positioned lever pivotally mounted intermediate its length on said stationary knife blade in shearing relation thereto, said vertically positioned lever having at one end thereof an offset head disposed parallel to said elongated stationary knife blade intermediate the length thereof, said offset head forming an inverted arcuate knife blade at the upper end of said vertically positioned lever operative to co-act with said elongated stationary knife blade to form a holding and shearing means for detaching the appendages of the chickens or the like, power-actuated means suspendingly supported on the under side of said flat upper surface and secured to the opposite end of said vertically positioned lever to effect pivotal movement of said arcuate knife blade relative to said stationary elongated knife blade, and remotely positioned manually operable means for energizing and controlling said power actuated means.

References Cited by the Examiner

UNITED STATES PATENTS

| | | | |
|---|---|---|---|
| 2,669,748 | 2/1954 | Ine | 17—11.3 |
| 2,859,471 | 11/1958 | Zebarth | 17—11.1 |
| 3,115,667 | 12/1963 | Lis et al. | 17—11 |

SAMUEL KOREN, *Primary Examiner.*

LUCIE H. LAUDENSLAGER, *Assistant Examiner.*